No. 634,362. Patented Oct. 3, 1899.
P. S. MARSHALL.
APPARATUS FOR MERCERIZING.
(Application filed June 24, 1899.)

(No Model.)

Witnesses
Chas H. Smith
J. Staib

Inventor
Percy Sykes Marshall
per L. W. Terrell & Son
attys

THE NORRIS PETERS CO., PHOTO-LITHO., WASHINGTON, D. C.

UNITED STATES PATENT OFFICE.

PERCY SYKES MARSHALL, OF HUDDERSFIELD, ENGLAND, ASSIGNOR TO THE COPLEY, MARSHALL & COMPANY, LIMITED, OF SAME PLACE.

APPARATUS FOR MERCERIZING.

SPECIFICATION forming part of Letters Patent No. 634,362, dated October 3, 1899.

Application filed June 24, 1899. Serial No. 721,715. (No model.)

*To all whom it may concern:*

Be it known that I, PERCY SYKES MARSHALL, a subject of the Queen of Great Britain and Ireland, and a resident of Huddersfield, in the county of York, England, have invented a certain new and useful Improved Apparatus for Mercerizing Vegetable Fibers, (for which I have made application for a patent in Great Britain, No. 12,300, bearing date June 13, 1899,) of which the following is a specification.

In mercerizing vegetable fibers so as to impart a silky gloss and also to prevent shrinkage of the material it is necessary that the hanks should be tightly stretched before or immediately after the mercerizing liquid has been eliminated from them. This operation is generally performed by stretching the hanks on a frame, which is successively immersed in tanks containing the mercerizing, washing, or neutralizing liquids, and the said hanks require turning during the immersions, so as to insure uniform action.

The apparatus forming the subject of this invention enables the hanks to be immersed in successive baths in a stretched state, the said hanks being turned or moved on their holders during the immersing process, and finally their tension is slackened, so as to facilitate their removal from the machine.

Figure 1:
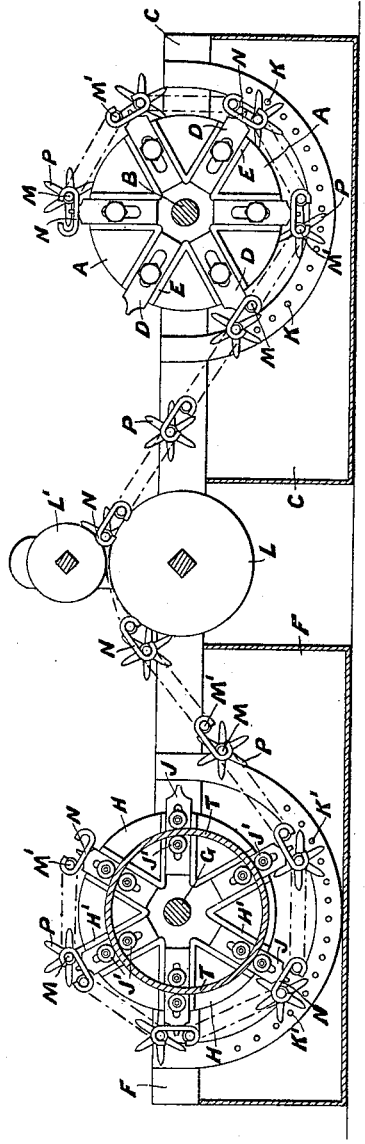
Figure 2:
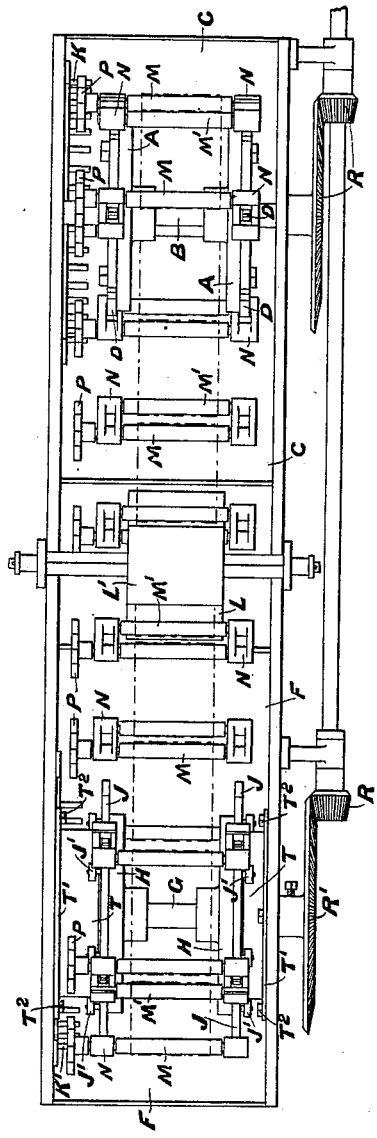

In the drawings, Figure 1 shows a sectional side elevation of the apparatus, and Fig. 2 is a plan of the same.

A are two disks, which are mounted on an axle B, carried in bearings on the sides of a tank C, and D are radial arms, which are carried in guides E on the disks A in such a manner that the arms D may be moved toward or from the axle B and be clamped in position, as required.

F is a second tank, in which is mounted an axle G, carrying disks H, the latter having guides H', carrying radially-sliding arms J. The arms J are provided with pairs of friction-rollers J', which embrace eccentric rails T, fixed by means of flanges T' and bolts T² to the interior of the tank F in such a manner that the rotation of the disks H causes the arms J to move radially in and out, the ends of the said arms being nearest to the axle G at the upper portion of their revolution and projecting out farthest at the lower portion of their revolution.

K is a segmental rack situated in the tank C, and K' is a similar rack situated in the tank F.

L L' are guide-rollers situated between the tanks C and F.

The hanks to be mercerized are threaded on pairs of rods M M', and links N are employed for coupling the rods together, so as to form a chain. The links N are shaped at their ends so as to facilitate the connection of the rods M M', and the centers of the links N are formed with slots to enable them to take onto the ends of the radial arms D and J. The rods M are provided with star-wheels P for gearing with the segmental racks K K', and the axles B and G are geared together through the medium of bevel-gearing R. The said gearing R is adjustable, so that the axles B and G may be turned and adjusted relatively to each other.

The chain of hanks and connecting-links is placed on the ends of the radial arms D, and after passing through the tank C the chain passes between the guide-rollers L L' and thence into the tank F, where the links N of the said chain engage with the ends of the radial arms J. The requisite amount of strain on the chain is effected by the rotary adjustment of the disks A relatively to the disks H by means of an adjustable bevel-wheel R' of the gearing R, and when the required tension has been imparted to the chain the stretched hanks will allow the links N to time in with the ends of the radial arms J. The chain is built up at the disks A, and the hanks are thus first brought into contact with the liquid in the tank C, and as the disks revolve the star-wheels P come into contact with the segmental rack K, and thus impart a turning effect to the rods M, which has the effect of slowly moving the hanks as they pass through the tank and insuring uniform action. As the chain leaves the disks A the hanks become stretched, and on leaving the tank C they pass between the rollers L and L', where any excess of liquid is expressed. On descending into the tank F the hanks are again immersed while they are still in a stretched state, and as they are raised on the opposite side of the disks H the radial arms J are drawn in by means of their rollers J' running on the eccentric rails T, with the result that the ends of the arms J contract and loosen the stretch of the hanks, thus enabling the chain to be removed without difficulty.

Having now described my invention, what I claim as new, and desire to secure by Letters Patent, is—

1. The improved apparatus for mercerizing vegetable fibers herein described composed of two tanks each containing a pair of disks carried on axles coupled together by adjustable bevel-gearing, a pair of guide-rollers situated between the tanks, the disks in the first tank carrying guides in which are situated radial arms adjusted concentrically in the same, and the disks in the second tank carrying guides in which are situated radial arms which are regulated in their radial positions by friction-rollers mounted on them and traveling on opposite sides of an eccentric rail, as set forth.

2. The improved apparatus for mercerizing vegetable fibers herein described composed of two tanks each containing a pair of disks carried on axles coupled together by adjustable bevel-gearing, a pair of guide-rollers situated between the tanks, the disks in the first tank carrying guides in which are situated radial arms adjusted concentrically in the same, the disks in the second tank carrying guides in which are situated radial arms which are regulated in their radial positions by friction-rollers mounted on them and traveling on opposite sides of an eccentric guide-rail, in combination with a chain composed of hanks of vegetable fiber threaded on rods coupled together by links, the ends of the rods being provided with star-wheels suitable for gearing with racks situated in the tanks, as set forth.

In witness whereof I have hereunto set my hand in presence of two witnesses.

PERCY SYKES MARSHALL.

Witnesses:
GRIFFITH BREWER,
JOHN JOWETT.